US009503379B2

United States Patent
Yang et al.

(10) Patent No.: US 9,503,379 B2
(45) Date of Patent: Nov. 22, 2016

(54) OPTIMIZING RADIO ACCESS NETWORK RESOURCES BASED ON END-TO-END ANALYTICS

(71) Applicant: Verizon Patent and Licensing Inc., Arlington, VA (US)

(72) Inventors: Jin Yang, Orinda, CA (US); Deepak Kakadia, Antioch, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 102 days.

(21) Appl. No.: 14/251,320

(22) Filed: Apr. 11, 2014

(65) Prior Publication Data
US 2015/0295835 A1  Oct. 15, 2015

(51) Int. Cl.
*H04L 12/801* (2013.01)
*H04W 24/08* (2009.01)

(52) U.S. Cl.
CPC .............. *H04L 47/18* (2013.01); *H04W 24/08* (2013.01); *H04L 47/14* (2013.01)

(58) Field of Classification Search
None
See application file for complete search history.

(56) References Cited

U.S. PATENT DOCUMENTS

| 2007/0025264 A1* | 2/2007 | Cheng | H04L 47/14 370/252 |
| 2008/0095173 A1* | 4/2008 | Bugenhagen | H04L 1/0001 370/395.21 |
| 2010/0214914 A1* | 8/2010 | Perez de la Rosa | H04L 47/10 370/230 |
| 2014/0133302 A1* | 5/2014 | Fu | H04L 45/125 370/231 |

* cited by examiner

*Primary Examiner* — Brandon Renner
*Assistant Examiner* — Jay Vogel

(57) ABSTRACT

A system may be configured to determine a measure of end-to-end latency associated with traffic sent from a first user device to a second user device, the traffic being sent via at least one radio access network ("RAN"); determine that the measure of end-to-end latency exceeds a threshold latency; and output, based on determining that the measure of end-to-end latency exceeds the threshold latency, one or more parameters to the RAN. The one or more parameters may cause the RAN to elevate a priority associated with the traffic when transported via the RAN.

20 Claims, 8 Drawing Sheets

700 →

| Description | QCI | Max. End-to-End Latency |
|---|---|---|
| Real-time audio content | 1 | 30ms |
| IMS signaling, app signaling | 5 | 90ms |
| Video portion of video telephony | 6 | 150ms |
| Public safety, enterprise users | 7 | 170ms |

| Sender | Recipient | Max. End-to-End Latency | Meas. End-to-End Latency |
|---|---|---|---|
| UD1 | UD2 | 30ms | 20ms |
| UD2 | UD3 | 150ms | 200ms |
| UD4 | UD5 | 30ms | 25ms |
| UD4 | UD5 | 90ms | 89ms |

Measured latency near threshold      Measured latency above threshold

FIG. 8

OPTIMIZING RADIO ACCESS NETWORK RESOURCES BASED ON END-TO-END ANALYTICS

BACKGROUND

Networks, such as wireless telecommunications networks, allow communication between user devices (such as cellular telephones) and other devices (such as servers, other user devices, etc.). Traffic between two user devices may traverse two or more different networks, such as two different radio access networks ("RANs"). Each RAN may utilize techniques in order to ensure a particular quality of experience ("QoE") associated with the RAN, but these techniques may be based on a lack of awareness of the overall QoE associated with traffic between the two user devices. For example, while one RAN may provide relatively fast (e.g., high bandwidth and/or low latency) communications from one user device, the other RAN may provide relatively low bandwidth communications to the other user device. In such a situation, the overall QoE may be negatively affected (e.g., data packets may be delayed, lost, etc.).

BRIEF DESCRIPTION OF THE DRAWINGS

FIGS. 7 and 8 illustrate example data structures that may be stored by a delay-based optimizer;

DETAILED DESCRIPTION OF PREFERRED EMBODIMENTS

The following detailed description refers to the accompanying drawings. The same reference numbers in different drawings may identify the same or similar elements.

Figure 1:
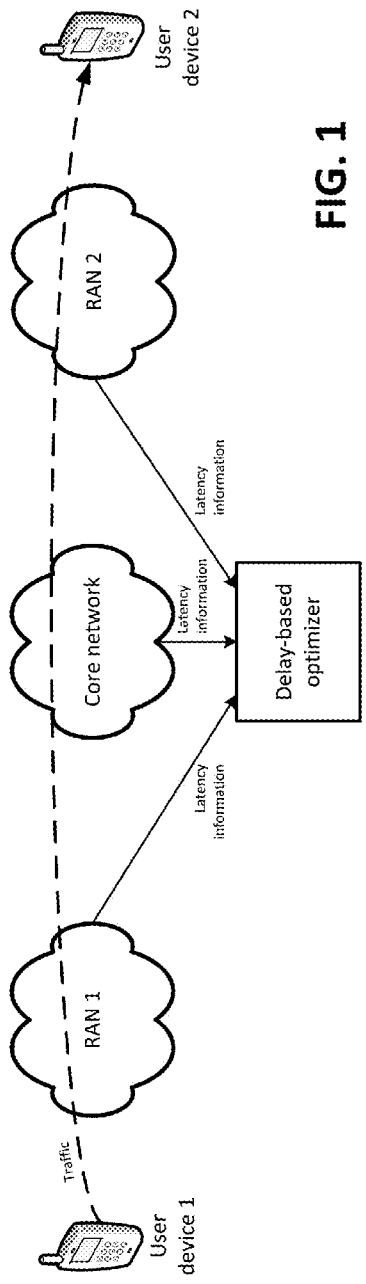
FIGS. 1 and 2 illustrate an overview of one or more example implementations described herein.

Techniques described herein may allow for optimization and configuration of one or more radio access networks ("RANs") based on end-to-end performance analytics. For example, as shown in FIG. 1, assume that two user devices (i.e., "User device 1" and "User device 2," which may be wireless telephones) are in communication (e.g., are participating in a voice call). As shown, User device 1 may be in communication with a first RAN ("RAN 1"), while User device 2 may be in communication with a second RAN ("RAN 2"). For instance, RAN 1 and RAN 2 may be associated with, and may provide wireless coverage to, separate geographical areas. Thus, traffic from User device 1 may traverse RAN 1 and RAN 2, as well as a core network (and/or one or more other networks or devices).

The path that the traffic, from User device 1, traverses while being provided to User device 2, may be logically split into a number of segments. As shown in FIG. 1, a simplified segmentation of the path may include a segment associated with RAN 1, the core network, and RAN 2. Each segment may be associated with a measure of latency, with respect to the traffic (e.g., a measure amount of time between a time at which the traffic enters the segment and a time at which the traffic exits the segment). As shown in FIG. 1, a delay-based optimizer may receive information regarding measures of latency associated with the various segments via which the traffic traverses.

Based on the received information, the delay-based optimizer may determine an end-to-end latency associated with the path, taken by the traffic from User device 1 to User device 2. As described herein, the delay-based optimizer may analyze the end-to-end latency, in order to determine whether the end-to-end latency is acceptable. For example, the delay-based optimizer may compare the end-to-end latency to a threshold latency associated with a type of the traffic, a threshold latency associated with one or both of the user devices, etc.

Figure 2:
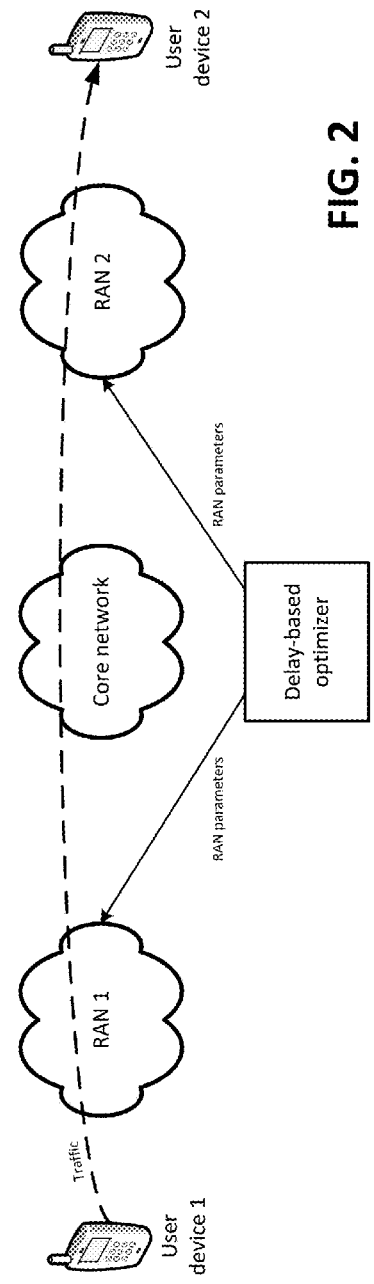

As shown in FIG. 2, the delay-based scheduler may output RAN parameters to RAN 1 and/or RAN 2, in order to optimize the operation of one or both of the RANs. The RAN parameters may include, for example, queue scheduling parameters, parameters regarding resource blocks of base stations, and/or other parameters.

Figure 3:
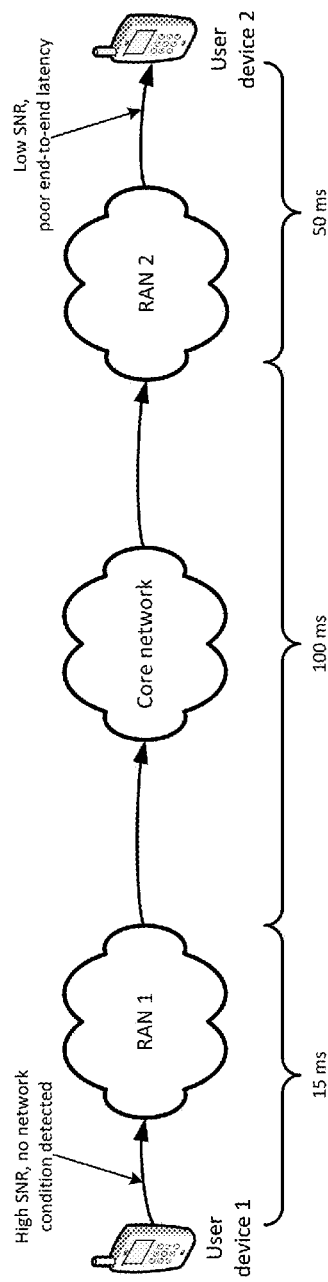
FIG. 3 illustrates a situation where end-to-end delay-based optimization may be desirable.

FIG. 3 illustrates an example situation in which such optimization may be desirable. For instance, as shown in FIG. 3, User device 1 may have a relatively strong connection (e.g., as indicated by a relatively high signal-to-noise ratio ("SNR")) with RAN 1. Because of the relatively strong connection, the segment associated with RAN 1 may be associated with a latency that is considered acceptable for the segment (e.g., 15 milliseconds ("ms"), in this example). As also shown in FIG. 3, User device 2 may have a relatively weak connection with RAN 2 (e.g., as indicated by a relatively low SNR). Due to the weak connection with RAN 2, the latency of the segment associated with RAN 2 may be adversely affected (e.g., due to dropped packets), thus adversely affecting the end-to-end latency of the traffic from User device 1 to User device 2.

The end-to-end latency of the traffic, in this example, may be 165 ms. In some instances, 165 ms may be considered unacceptable. For instance, assume that the traffic is associated with a type of traffic for which 140 ms is considered the maximum acceptable end-to-end latency. Traditionally, RAN 1 may not be able to detect a potential issue with the traffic, since the segment latency, associated with RAN 1, may be considered to be within an acceptable range. Further assume that RAN 1 has additional resources available, which were not allocated to the traffic. In this situation, it may be desirable for RAN 1 to allocate additional resources to the traffic, in order to improve the end-to-end latency associated with the traffic. In other words, even when RAN 1 already provides acceptable performance, it may be desirable for RAN 1 to provide even better performance, in order to compensate for performance issues associated with RAN 2.

Figure 4:
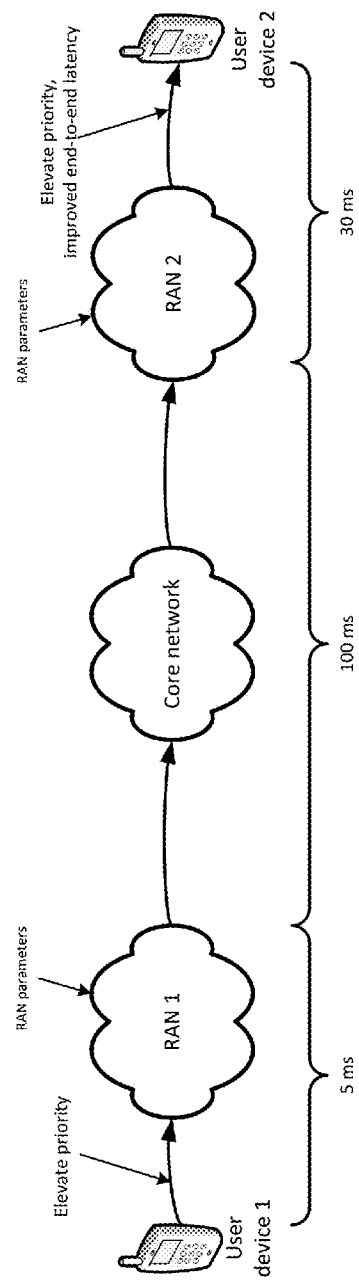
FIG. 4 illustrates an example result of performing end-to-end delay-based optimization, in accordance with some implementations.

The RAN parameters, generated by the delay-based optimizer (e.g., as shown in FIG. 2), may be used by RAN 1 and/or RAN 2, in order to improve end-to-end latency. For example, as shown in FIG. 4, RAN 1 may elevate the priority of the traffic from User device 1 (e.g., elevate queue scheduling priority, allocate more resource blocks, etc.) based on the RAN parameters. In some implementations, RAN 2 may also elevate the priority of the traffic from User device 1 based on the RAN parameters. The modifications, made based on the RAN parameters, may improve the segment latencies associated with RAN 1 and/or RAN 2, and thus may improve overall end-to-end latency (e.g., reduce the end-to-end latency below a threshold latency).

While discussed above in the context of poor end-to-end latency being caused by latency introduced by a RAN, some implementations may alleviate poor end-to-end latency caused by other factors. For instance, referring back to the previous examples, assume that RAN 1 and RAN 2 both provide "acceptable" performance (e.g., segment latencies associated with RANs 1 and 2 are below a threshold latency) for traffic, but end-to-end latency is still not acceptable (e.g., above a threshold latency). The delay-based optimizer may, in some implementations, provide RAN parameters to RAN 1 and/or RAN 2 to elevate the priority of the traffic, in order to provide lower latency. The lower latency may compensate for the latency introduced by external networks and/or devices, and may cause the end-to-end latency to fall below a threshold latency.

Figure 5:
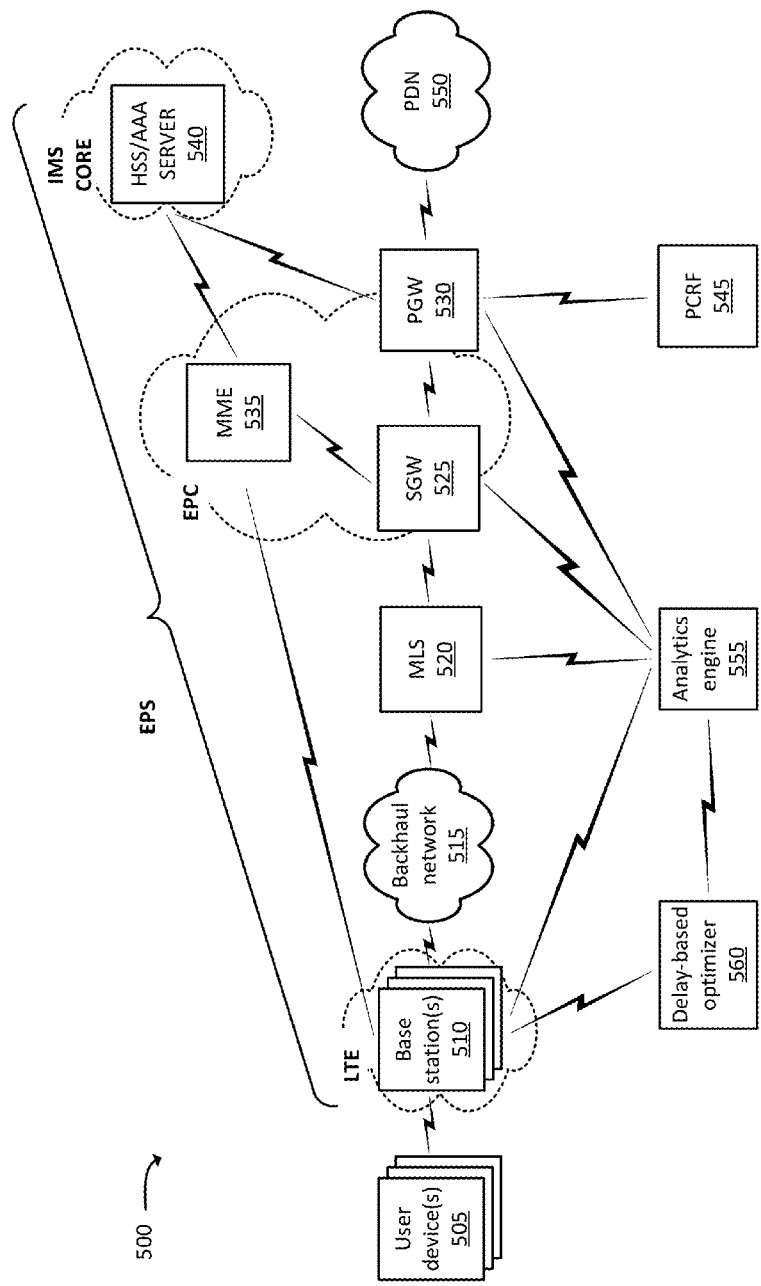
FIGS. 5 and 6 illustrate examples of one or more environments in which systems and/or methods, described herein, may be implemented.

FIG. 5 illustrates an example environment 500, in which systems and/or methods described herein may be implemented. As shown in FIG. 5, environment 500 may include one or more user devices 505 (hereinafter sometimes referred to collectively as "user devices 505," or individually as "user device 505"), base station 510 (hereinafter sometimes referred to collectively as "base stations 510," or individually as "base station 510"), backhaul network 515, multi-layer switch ("MLS") 520, serving gateway ("SGW") 525, packet data network ("PDN") gateway ("PGW") 530, mobility management entity device ("MME") 535, home subscriber server ("HSS")/authentication, authorization, accounting ("AAA") server 540 (hereinafter referred to as "HSS/AAA server 540"), policy charging and rules function ("PCRF") 545, PDN 550, and analytics engine 555.

The quantity of devices and/or networks, illustrated in FIG. 5, is provided for explanatory purposes only. In practice, there may be additional devices and/or networks; fewer devices and/or networks; different devices and/or networks; or differently arranged devices and/or networks than illustrated in FIG. 5. Alternatively, or additionally, one or more of the devices of environment 500 may perform one or more functions described as being performed by another one or more of the devices of environment 500. Devices of environment 500 may interconnect via wired connections, wireless connections, or a combination of wired and wireless connections.

Environment 500 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 510, some or all of which may take the form of an eNB, via which user device 505 may communicate with the EPC network. The EPC network may include one or more SGWs 525, PGWs 530, and/or MMEs 535, and may enable user device 505 to communicate with PDN 550 and/or an Internet protocol ("IP") multimedia subsystem ("IMS") core network. The IMS core network may include HSS/AAA server 540, and may manage authentication, session initiation, account information, a user profile, etc., associated with user device 505.

User device 505 may include any computation and communication device, such as a wireless mobile communication device that is capable of communicating with base station 510 and/or PDN 550. For example, user device 505 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 505 may send traffic to and/or receive traffic from PDN 550 via base station 510, backhaul network 515, MLS 520, SGW 525, and/or PGW 530.

Base station 510 may include one or more network devices that receive, process, and/or transmit traffic, such as calls, audio, video, text, and/or other data, destined for and/or received from user device 505. In one example, base station 510 may be an evolved Node B ("eNB") device and may be part of the LTE network. Additionally, or alternatively, one or more other base stations 510 may be associated with a RAN that is not associated with the LTE network (e.g., a wireless hot spot, a wireless access point, etc.). Base station 510 may receive traffic from and/or send traffic to PDN 550 via SGW 525 and PGW 530. Base station 510 may send traffic to and/or receive traffic from user device 505 via, for example, an air interface.

Backhaul network 515 may include one or more networking devices (e.g., routers and/or switches) and links (e.g., fiber or coaxial links), that connect respective base station 510 to a core network (e.g., a core network that includes MLS 520, SGW 525, and/or PGW 530). In some implementations, access to backhaul network 515 may be provided by a particular service provider, to a different service provider who is associated with SGW 525, PGW 530, and/or PDN 550.

MLS 520 may include one or more network devices that perform switching functionality on traffic received from SGW 525 and/or backhaul network 515. MLS 520 may operate multiple layers of the Open Systems Interconnection ("OSI") reference model, in contrast with other types of switches that traditionally operate only on the Data Link Layer ("DLL"). For example, MLS 520 may perform deep packet inspection to perform routing functions.

SGW 525 may include one or more network devices that gather, process, search, store, and/or provide information in a manner described herein. SGW 525 may, for example, aggregate traffic received from one or more base stations 510 and may send the aggregated traffic to PDN 550 via PGW 530.

PGW 530 may include one or more network devices that gather, process, search, store, and/or provide information in a manner described herein. PGW 530 may aggregate traffic received from one or more SGWs 525, etc. and may send the aggregated traffic to PDN 550. PGW 530 may also, or alternatively, receive traffic from PDN 550 and may send the traffic toward user device 505 via SGW 525 and/or base station 510.

MME 535 may include one or more computation and communication devices that perform operations to register user device 505 with the EPS, to establish bearer channels associated with a session with user device 505, to hand off user device 505 from the EPS to another network, to hand off user device 505 from the other network to the EPS, and/or to perform other operations. MME 535 may perform policing operations on traffic destined for and/or received from user device 505.

HSS/AAA server 540 may include one or more server devices that manage, update, and/or store, in a memory associated with HSS/AAA server 540, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 505); and/or other information. Additionally, or alternatively, HSS/AAA server 540 may perform authentication, authorization, and/or accounting operations associated with the subscriber and/or a communication session with user device 505.

PCRF 545 may include one or more server devices that aggregate information to and from the EPC network and/or other sources. PCRF 545 may receive information regarding policies and/or subscriptions from one or more sources, such as subscriber databases and/or from one or more users (such as, for example, an administrator associated with PCRF 545).

PDN 550 may include one or more wired and/or wireless networks. For example, PDN 550 may include a packet data network ("PDN"), such as an Internet Protocol ("IP")-based PDN. PDN 550 may include, for example, a wide area network ("WAN") such as the Internet, a core network of a telecommunications provider, a private enterprise network, and/or one or more other networks. User device 505 may connect, through PGW 530, to data servers, application servers, other user devices 505, and/or to other servers or applications that are coupled to PDN 550.

Analytics engine 555 may include one or more server devices that receive information (e.g., key performance indicator ("KPI") information and/or other information) from network nodes that serve as signal bearers for traffic to and/or from user device 505 (e.g., base station 510, MLS 520, SGW 525, and/or PGW 530), and/or from another device. As described further below, analytics engine 555 may aggregate KPI information, received from multiple network nodes, in order to generate useful information regarding traffic. For example, analytics engine 555 may identify an end-to-end path via traffic to and/or from user device 505 is transmitted, and may identify measures of per-segment and/or end-to-end latency associated with the traffic.

In order to provide information to analytics engine 555, network nodes may be associated with hardware and/or software that monitor traffics received and/or sent by network nodes. This hardware and/or software may analyze monitored traffic to determine, for example, KPI information associated with a respective network node or a link between network nodes, and may provide the information to analytics engine 555. In some implementations, one network node may receive information from another network node, in order to determine KPI information regarding a link between the network nodes. For example, a first network node may receive information from another network node regarding a particular data packet, and may determine one or more KPIs based on this information (e.g., transport latency associated with a link between the first and second network nodes, packet drop rate, etc.).

In some implementations, analytics engine 555 may communicate with network nodes over existing communication links. That is, while analytics engine 555 is conceptually illustrated in FIG. 5 as being connected to base station 510, MLS 520, SGW 525, and PGW 530, in practice, the actual communication paths between these network nodes and analytics engine 555 may be different than the illustrated path. For example, in some implementations, analytics engine 555 may be communicatively coupled to base station 510 via PDN 550. In some such implementations, for instance, base station 510 may communicate with analytics engine 555 via backhaul network 515, MLS 520, SGW 525, PGW 530, and/or any other intervening devices. In other implementations, one or more network nodes may include one or more other communication links to analytics engine 555 (e.g., direct and/or indirect communication links).

In some implementations, the data sent from network nodes to analytics engine 555 may be of a relatively low priority, such that this data does not preempt user data (e.g., data sent to and/or from user device 505). For example, network nodes may set a priority flag, of data sent to analytics engine 555, to be lower than a priority that is associated with user data. For instance, this priority flag may be set to a lowest possible priority. In some situations, such data may be referred to as "bulk data," or as being associated with a "scavenger class." As may be apparent from the above discussion, in some implementations, the information sent from network nodes to analytics engine 555 may include information regarding packets, without including all packet information. For instance, the information may include a portion or entirety of header information, of a particular packet, without including some or all of the payload (or content) information, of the particular packet.

Delay-based optimizer 560 may include one or more server devices that modify RAN parameters based on detecting potential performance issues associated with end-to-end latency of traffic. For example, delay-based optimizer 560 may receive information from PDN 550, indicating the end-to-end latency of traffic associated with user device 505, and may detect potential performance issues when the end-to-end latency is above, is near, or is approaching a threshold latency. For example, delay-based optimizer 560 may identify a Quality of Service ("QoS") class identifier ("QCI") value associated with traffic, and may identify the threshold end-to-end latency based on the QCI value. In some implementations, delay-based optimizer 560 may analyze traffic on a per-user device and/or on a per-QCI basis. For example, delay-based optimizer 560 may detect potential performance issues with some types of traffic associated with a particular user device 505, while not detecting potential performance issues with other types of traffic associated with the same user device 505. The RAN parameters, generated by delay-based optimizer 560, may be provided to one or more devices of one or more RANs, such as to one or more base stations 510 (e.g., a base station via which user device 505 is sending and/or receiving traffic). The RAN parameters may include, for example, queue scheduling parameters (e.g., weighting information for the traffic), QCI parameters (e.g., instructions to modify QoS treatment of the traffic), resource parameters (e.g., instructions to allocate additional resource blocks to user device 505 and/or to the traffic), etc.

Figure 6:
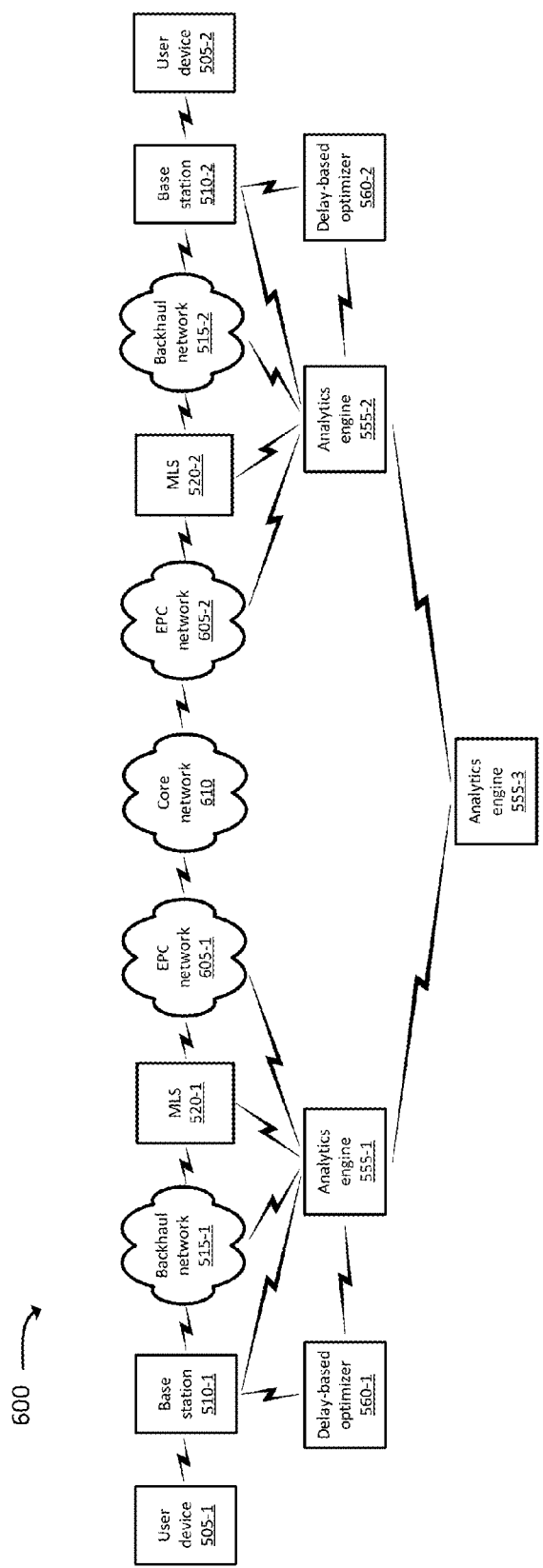

FIG. 6 illustrates environment 600, which may be another view of one or more devices shown in FIG. 5. Environment 600 may conceptually illustrate a network path, via which traffic between user device 505-1 and user device 505-2 may be transmitted. For example, the network path, for traffic from user device 505-1, may include base station 510-1, backhaul network 515-1, MLS 520-1, EPC network 605-1, core network 610, EPC network 605-2, MLS 520-2, backhaul network 515-2, base station 510-2, and user device 505-2. EPC network 605-1 and/or EPC network 605-2 may each include a different instance of (or, in some situations, the same) one or more devices shown in FIG. 5, such as SGW 525 and PGW. Core network 610 may include a core network of a telecommunications provider, and may be communicatively coupled to multiple EPC networks 605 and/or other networks or devices.

In the example shown in FIG. 6, environment 600 may include a hierarchical arrangement of analytics engines 555. For example, analytics engine 555-1 may receive KPI information from base station 510-1, backhaul network 515-1, MLS 520-1, and EPC network 605-1, while analytics engine 555-2 may receive KPI information from base station 510-2, backhaul network 515-2, MLS 520-2, and EPC network 605-2. Analytics engine 555-3 may receive KPI information from analytics engine 555-1 and analytics engine 555-2 (e.g., some or all of the KPI information received by analytics engine 555-1 and/or analytics engine 555-2), and may serve as a central repository for KPI information regarding the end-to-end network path. In some implementations, analytics engine 555-3 may generate additional KPI information not collected or determined by analytics engine 555-1 and/or analytics engine 555-2. For example, analytics engine 555-3 may determine a segment latency, associated with core network 610, based on an egress time associated with EPC network 605-1 (e.g., as provided by analytics engine 555-1) and an ingress time associated with EPC network 605-2 (e.g., as provided by analytics engine 555-2).

Analytics engine 555-3 may, in some implementations, separately determine the end-to-end latency of traffic between user device 505-1 and user device 505-2 on an uplink/downlink basis. For example, analytics engine 555-3 may maintain separate information identifying measures of end-to-end latencies of traffic from user device 505-1 to user device 505-2, and of traffic from user device 505-2 to user device 505-1. While analytics engines 555 are shown in FIG. 6 as being arranged in a hierarchical manner, some implementations may include a "flat" arrangement, in which a central analytics engine 555 receives KPI information directly from network nodes (as opposed to from other analytics engines 555). Further, while one level of hierarchy is shown in FIG. 6, multiple levels of hierarchy may be used in practice, in accordance with some implementations. A hierarchical arrangement of analytics engines 555 may be useful in situations where different networks are owned and/or operated by different entities, and/or are located in geographically distinct regions (e.g., different parts of a country, different countries, different states/provinces, etc.).

As also shown in FIG. 6, base stations 510-1 and 510-2 may each be associated with a respective delay-based optimizer 560 (i.e., delay-based optimizer 560-1 and delay-based optimizer 560-2). Delay-based optimizer 560-1, for example, may receive KPI information (e.g., latency information) from analytics engine 555-1, analytics engine 555-3, and/or from another source, and may detect potential performance issues based on the received information. Delay-based optimizer 560-1 may generate RAN parameters based on the detected potential performance issues. In some implementations, delay-based optimizer 560-1 and delay-based optimizer 560-2 may communicate with each other and/or with another device, in order to coordinate RAN parameters generated by each of delay-based optimizer 560-1 and delay-based optimizer 560-2. In some implementations, a single delay-based optimizer 560 may provide RAN parameters to base station 510-1 and base station 510-2 based on detected potential performance issues.

FIGS. 7 and 8 illustrate example data structures 700 and 800, respectively, which may be stored by delay-based optimizer 560. Data structure 700, for instance, may include information regarding descriptions of various types of traffic, QCIs associated with traffic types, and maximum ("Max.") end-to-end latency. These values may be set by, for example, a network administrator.

Descriptions of traffic types may indicate types of traffic, which are associated with other parameters stored in data structure 700. For instance, as shown, real-time audio content (e.g., voice call traffic, or an audio portion of a video call) may be associated with a QCI of "1," which may be a highest QCI of the QCIs shown in FIG. 7. In some implementations, the descriptions may be used for informational purposes. For instance, a network administrator who is accessing or modifying information in data structure 700 may use the descriptions to aid the network administrator in identifying which QCIs are associated with which types of traffic.

The maximum end-to-end latency, associated with a particular QCI, may, in some implementations, be used by delay-based optimizer 560 to determine whether performance issues may exist for particular traffic. For example, delay-based optimizer 560 may identify a QCI associated with traffic, a measure of end-to-end latency associated with the traffic, and a maximum end-to-end latency associated with the QCI. Traffic for which the measured end-to-end latency is above, is near, and/or is approaching the maximum end-to-end latency may identified as having a potential performance issue.

FIG. 8 illustrates an example data structure 800, that may correspond to measured end-to-end latency values for traffic between various user devices. For example, data structure 800 may include "Sender," "Recipient," "Max. End-to-End Latency," and "Measured ('Meas.') End-to-End Latency" fields. Each row, in data structure 800, may correspond to a particular traffic flow, or a set of traffic flows, between two user devices 505. For instance, one row may correspond to one- or two-way voice call traffic associated with two user devices 505, while another row may correspond to a file transfer between the same two user devices 505.

The Sender and the Recipient fields may include identifiers of user devices 505, which may be senders and/or recipients of traffic. A particular identifier may include, for example, an IP address and/or port number, an International Mobile Subscriber Identity ("IMSI") value, an International Mobile Station Equipment Identity ("IMEI") value, and/or another value that identifies a particular user device 505.

The Max. End-to-End Latency values may be based on, for example, identifying a QCI associated with traffic. For example, delay-based optimizer 560 may identify and/or receive information identifying a QCI associated with a particular traffic flow, and may determine the maximum end-to-end latency based on performing a lookup of data structure 700. The Meas. End-to-End Latency values may be based on information received from analytics engine 555. In some implementations, these values may be an average (e.g., a moving average) of the traffic sent over a particular timeframe (e.g., over the last one second, over the last one minute, over the last one hour, etc.). In some implementations, these values may reflect the last received values from analytics engine 555, and/or some other value based on latency information received from analytics engine 555.

As shown, traffic from a particular user device 505 (referred to as "UD2") to another user device 505 (referred to as "UD3") may be associated with a maximum end-to-end latency of 150 ms. As also shown, the measured end-to-end latency, associated with the traffic, may be 200 ms (i.e., above the maximum end-to-end latency). In this scenario, delay-based optimizer 560 may detect that a potential performance issue exists with respect to this traffic, and may take corrective measures (e.g., generate RAN parameters, as mentioned above) based on detecting the issue.

As another example, traffic from a particular user device 505 (referred to as "UD4") to another user device 505 (referred to as "UD5") may be associated with a maximum end-to-end latency of 90 ms. As also shown, the measured end-to-end latency, associated with the traffic, may be 89 ms. In this scenario, delay-based optimizer 560 may determine that the measured end-to-end latency is close to (e.g., is within a particular percentage of) the maximum end-to-end latency. Additionally, or alternatively, delay-based optimizer 560 may determine that the measured end-to-end latency is approaching the maximum end-to-end latency (e.g., based on a trend of the measured end-to-end latency over time). Based on one or both of these determinations, delay-based optimizer 560 may detect that a potential performance issue exists with respect to this traffic, and may take corrective measures (e.g., generate RAN parameters, as mentioned above) based on detecting the issue.

Figure 9:
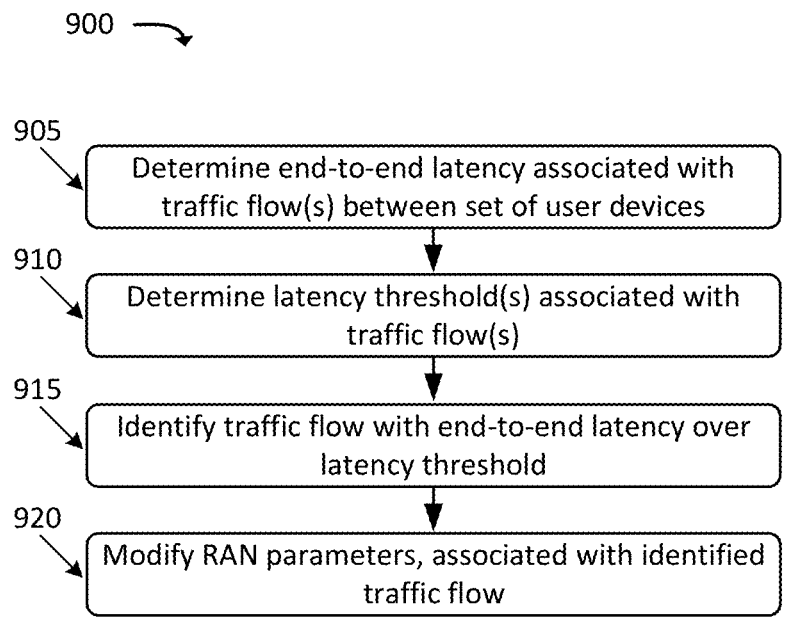
FIG. 9 illustrates an example process for performing end-to-end delay-based optimization, in accordance with some implementations.

FIG. 9 illustrates an example process 900 for optimizing the performance of one or more RANs, based on end-to-end latency analytics information. In one example implementation, process 900 may be performed by delay-based optimizer 560. In other implementations, some or all of process 900 may be performed by one or more other devices in lieu of, or in conjunction with, delay-based optimizer 560.

Process 900 may include determining, at 905, an end-to-end latency associated with one or more traffic flows between a set of user devices. For example, as described above, delay-based optimizer 560 may receive latency information from analytics engine 555, including end-to-end latency information associated with one or more sets of user devices. For example, as described above, the latency information may correspond to one- or two-way communications between a particular set of user devices 505. As also mentioned above, the end-to-end latency information may be provided on a per-QCI basis. Thus, multiple different traffic flows between the same set of user devices 505, associated with multiple different QCIs, may be associated with multiple different end-to-end latency values.

Process 900 may additionally include determining, at 910, one or more latency thresholds associated with the one or more traffic flows. For example, as described above, delay-based optimizer 560 may determine a threshold latency with each traffic flow. In some implementations, the threshold latency may be based on a QCI associated with a particular traffic flow, and/or based on one or more other factors.

Process 900 may also include identifying, at 915, a particular traffic flow with an end-to-end latency that is above a corresponding threshold latency. For example, delay-based optimizer 560 may compare the end-to-end latency information (received at 905) to the latency thresholds (determined at 910) in order to identify one or more traffic flows, for which the end-to-end latency values exceed, are near, or approach a respective latency threshold.

Process 900 may further include modifying, at 920, RAN parameters, associated with the identified traffic flow. For example, delay-based optimizer 560 may output an instruction to one or more base stations 510 (e.g., a base station 510 associated with one user device 505 and/or base stations 510 associated with both user devices 505) to elevate a priority associated with the traffic flow. In some implementations, delay-based optimizer 560 may receive configuration parameters associated with a particular base station 510, and may output modified configuration parameters to the particular base station 510, based on the identification made at 915.

For example, delay-based optimizer 560 may receive information indicating a type of scheduling performed by base station 510 (e.g., weighted fair queuing ("WFQ"), weighted random early detection ("WRED"), First in First Out ("FIFO"), etc.), and parameters associated with the type of scheduling (e.g., queue weights, quantities of queues, queue lengths, etc.). Delay-based optimizer 560 may use this configuration information to modify the configuration of base station 510, in order to improve the latency associated with the identified traffic stream.

As another example, delay-based optimizer 560 may receive utilization information regarding one or both of the RANs, and may use the utilization information to modify the configuration of one or both base stations 510. For example, delay-based optimizer 560 may receive information indicating that one base station 510, involved in the traffic flow, has a relatively large amount of available resource blocks, while another base station 510, involved in the traffic flow, has a relatively small amount of (or no) available resource blocks. When generating RAN parameters to improve end-to-end latency, delay-based optimizer 560 may instruct base station 510, with the relatively large amount of available resource blocks, to allocate more resource blocks to the traffic flow, while delay-based optimizer 560 may forgo instructing the other base station 510 to allocate additional resource blocks to the traffic flow. In some implementations, some or all of process 900 may be repeated in an iterative manner, in order to continuously ensure that end-to-end latency is within acceptable levels.

Figure 10:
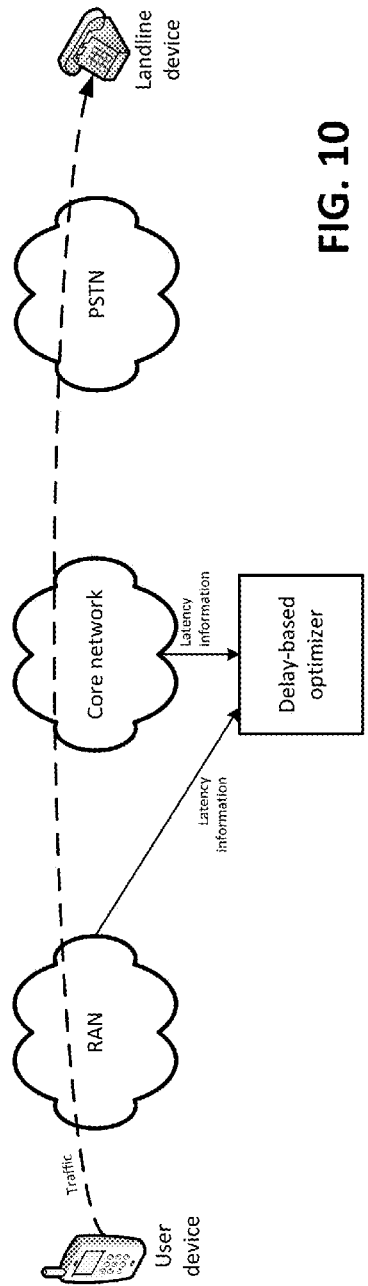
FIGS. 10 and 11 illustrate an example implementation of performing delay-based optimization between a user device that communicates with another device via a public switched telephone network ("PSTN")

While examples were described above in the context of two user devices 505, each communicating via a respective RAN, similar concepts may be applied in situations where a user device 505 communicates with another device (e.g., a landline telephone device) that is not associated with a RAN. For example, as shown in FIG. 10, a user device may communicate with a landline telephone device, which may be communicatively coupled to a PSTN. In this situation, latency information may be received from the RAN, associated with the user device, and one or more devices in a core network (e.g., a core network associated with a wireless telecommunications provider). The delay-based optimizer may compute a segment latency that corresponds to a latency from an egress of the user device to an egress of the core network.

Figure 11:
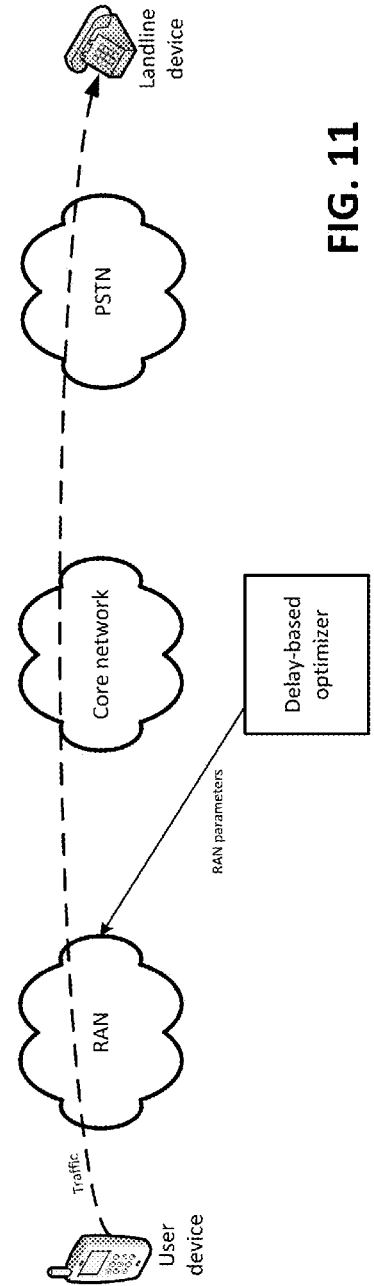

The delay-based optimizer may use this segment latency value in order to determine whether any performance issues exist with respect to the traffic. For example, the delay-based optimizer may compare the segment latency value to a different threshold than would be used for end-to-end latency values. As shown in FIG. 11, the delay-based optimizer may provide RAN parameters to the RAN, in situations where potential performance issues exist (and/or in which the performance can be improved).

While FIGS. 10 and 11 are described in the context of a user device in communication with a landline device, similar concepts may apply when a user device is in communication with non-landline devices. For example, similar techniques may be used when a first user device, associated with a first service provider, is in communication with a second user device via a RAN associated with a second service provider. For example, the second user device may be provided by the second service provider, and/or may be "roaming" on the RAN associated with the second service provider. In this situation, the delay-based optimizer may receive KPI information (e.g., latency information) regarding a RAN of the first service provider and a core network of the first service provider, but may not receive KPI information regarding networks and/or devices of the second service provider. The delay-based optimizer may optimize RAN parameters based on the KPI information regarding the RAN and core network of the first service provider.

Figure 12:
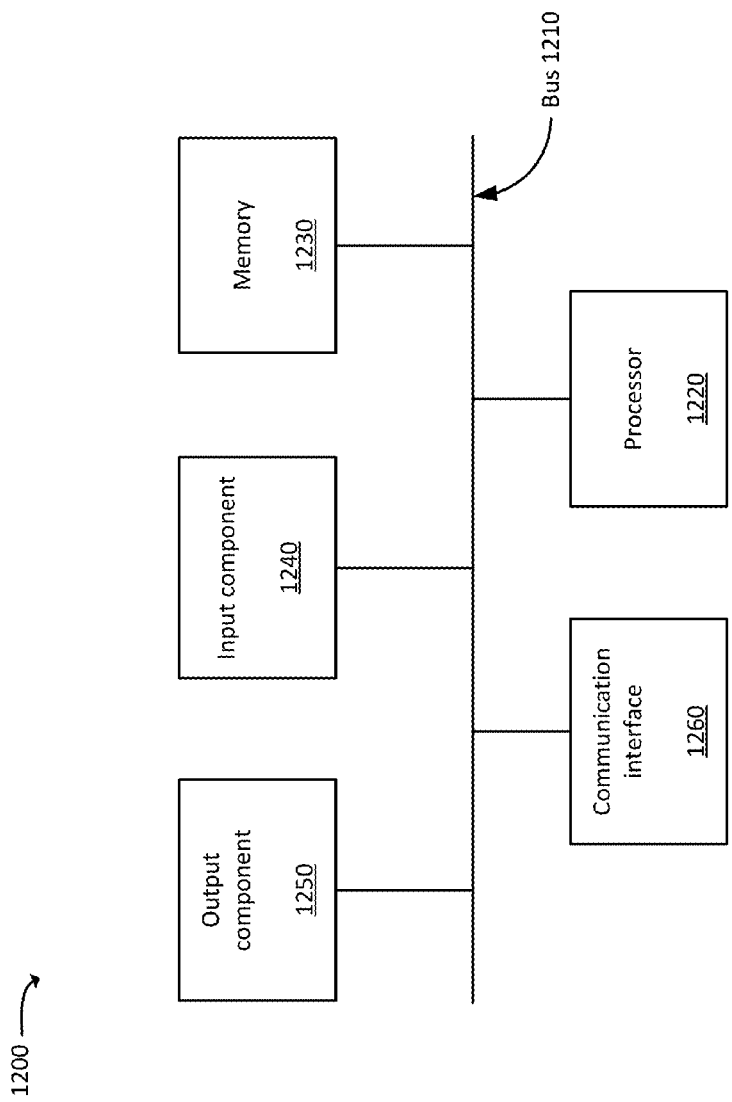
FIG. 12 illustrates example components of one or more devices, according to one or more implementations described herein.

FIG. 12 is a diagram of example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 9, the order of the blocks may be modified in other implementations. Further, non-dependent blocks may be performed in parallel.

Additionally, while examples of data structures are illustrated in FIGS. 7 and 8 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

Furthermore, while the above examples are described in the context of optimizing the latency of communications associated with a user device, similar techniques may be applied for other KPIs in addition to, or in lieu of latency. For example, similar techniques may be used to optimize packet drop rates, jitter, bandwidth, and/or other KPIs.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   determining, by one or more server devices, a measure of end-to-end latency associated with traffic sent from a first device to a second device, the traffic being sent via at least a first radio access network ("RAN") and a second RAN,
      wherein the first device is associated with the first RAN, and
      wherein the second device is associated with the second RAN;
   comparing, by the one or more server devices, the measure of end-to-end latency with a first threshold latency;
   determining, by the one or more server devices and based on the comparing, that the measure of end-to-end latency exceeds the first threshold latency;
   determining, by the one or more server devices, a segment latency associated with the first RAN;
   comparing, by the one or more server devices, the segment latency, associated with the first RAN, with a second threshold latency that is indicative of an acceptable latency for the first RAN;
   determining, by the one or more server devices and based on comparing the segment latency to the second threshold latency, that the segment latency does not exceed the second threshold latency;
   receiving, by the one or more server devices, first utilization information regarding the first RAN, the first utilization information indicating an amount of available resources associated with the first RAN;
   receiving, by the one or more server devices, second utilization information regarding the second RAN, the second utilization information indicating an amount of available resources associated with the second RAN;
   comparing, by the one or more server devices, the first utilization information to the second utilization information;
   determining, by the one or more server devices and based on comparing the first utilization information to the second utilization information, that the first RAN has more available resources than the second RAN;
   determining, by the one or more server devices and based on determining that the first RAN has more available resources than the second RAN, a set of parameters for the first RAN; and
   outputting, by the one or more server devices and based on determining that the measure of end-to-end latency exceeds the first threshold latency, the set of parameters to the first RAN, the set of parameters causing the first RAN to elevate a priority associated with the traffic when transported via the first RAN, even though the segment latency, associated with the first RAN, does not exceed the second threshold latency.

2. The method of claim 1, further comprising:
   determining a type of the traffic; and
   determining the first threshold latency based on the type of the traffic.

3. The method of claim 2, wherein determining the type of the traffic includes:
   determining a Quality of Service ("QoS") class identifier ("QCI") associated with the traffic.

4. The method of claim 1, wherein outputting the first set of parameters to the first RAN includes outputting the set of parameters to a base station associated with the first RAN, wherein the set of parameters causes the base station to elevate the priority associated with the traffic when transported via the base station by elevating a queue scheduling priority associated with the traffic.

5. The method of claim 1, wherein the set of parameters relate to a scheduling technique used by the first RAN.

6. The method of claim 1, wherein the measure of the end-to-end latency is based on an elapsed time between an egress of traffic from the first device to an ingress of the traffic to the second device.

7. The method of claim 1, wherein the traffic is associated with a first Quality of Service ("QoS") class identifier ("QCI"), and
   wherein the set of parameters includes an indication that the traffic should be associated with a different second QCI.

8. The method of claim 1, wherein the first RAN and the second RAN are different RANs.

9. The method of claim 1, wherein the set of parameters causes the first RAN to elevate the priority associated with the traffic when transported via the first RAN by allocating more resource blocks for the traffic.

10. A system, comprising:
    a memory device storing a set of computer-executable instructions; and
    a processor configured to execute the computer-executable instructions, wherein executing the computer-executable instructions causes the processor to:
       determine a measure of end-to-end latency associated with traffic sent from a first device to a second device, the traffic being sent via at least a first radio access network ("RAN") and a second RAN;
       determine that the measure of end-to-end latency exceeds a first threshold latency;
       determine a segment latency associated with the first RAN;
       compare the segment latency, associated with the first RAN, with a second threshold latency that is indicative of an acceptable latency for the first RAN;

determine, based on comparing the segment latency to the second threshold latency, that the segment latency does not exceed the second threshold latency;

receive first utilization information regarding the first RAN, the first utilization information indicating an amount of available resources associated with the first RAN;

receive second utilization information regarding the second RAN, the second utilization information indicating an amount of available resources associated with the second RAN;

compare the first utilization information to the second utilization information;

determine, based on comparing the first utilization information to the second utilization information, that the first RAN has more available resources than the second RAN;

determine, based on determining that the first RAN has more available resources than the second RAN, a set of parameters for the first RAN; and output, based on determining that the measure of end-to-end latency exceeds the first threshold latency, the set of parameters to the first RAN, the set of parameters causing the first RAN to elevate a priority associated with the traffic when transported via the first RAN.

11. The system of claim 10, wherein executing the processor-executable instructions further causes the processor to:
determine a type of the traffic; and
determine the first threshold latency based on the type of the traffic.

12. The system of claim 11, wherein executing the processor-executable instructions, to determine the type of the traffic, further causes the processor to:
determine a Quality of Service ("QoS") class identifier ("QCI") associated with the traffic.

13. The system of claim 10, wherein executing the processor-executable instructions, to output the set of parameters to the first RAN, further causes the processor to output the set of parameters to a base station associated with the first RAN.

14. The system of claim 10, wherein the one or more parameters relate to a scheduling technique used by the first RAN.

15. The system of claim 10, wherein the measure of the end-to-end latency is based on an elapsed time between an egress of traffic from the first device to an ingress of the traffic to the second device.

16. The system of claim 10, wherein the traffic is associated with a first Quality of Service ("QoS") class identifier ("QCI"), and wherein the one or more parameters include an indication that the traffic should be associated with a different second QCI.

17. The system of claim 10, wherein the first RAN and the second RAN are different RANs.

18. A non-transitory computer-readable medium storing a set of computer-executable instructions, which, when executed by a device, causes the device to:
determine a measure of end-to-end latency associated with traffic sent from a first user device to a second user device, the traffic being sent via at least a first radio access network ("RAN") and a second RAN;
determine that the measure of end-to-end latency exceeds a first threshold latency;
determine a segment latency associated with the first RAN;
compare the segment latency, associated with the first RAN, with a second threshold latency;
determine, based on comparing the segment latency to the second threshold latency, that the segment latency is below the second threshold latency;
receive first utilization information regarding the first RAN, the first utilization information indicating an amount of available resources associated with the first RAN;
receive second utilization information regarding the second RAN, the second utilization information indicating an amount of available resources associated with the second RAN;
compare the first utilization information to the second utilization information;
determine, based on comparing the first utilization information to the second utilization information, that the first RAN has more available resources than the second RAN;
determine, based on determining that the first RAN has more available resources than the second RAN, a set of parameters for the first RAN; and
output, based on determining that the measure of end-to-end latency exceeds the first threshold latency, the set of parameters to the first RAN, the set of parameters causing the first RAN to elevate a priority associated with the traffic when transported via the first RAN.

19. The non-transitory computer-readable medium of claim 18, wherein the set of parameters relate to a scheduling technique used by the first RAN, the set of parameters causing the first RAN to elevate a scheduling priority, for the scheduling technique, associated with the traffic.

20. The system of claim 18, wherein the traffic is associated with a first Quality of Service ("QoS") class identifier ("QCI"), and
wherein the set of parameters includes an indication that the traffic should be associated with a different second QCI.

* * * * *